United States Patent [19]

Chu

[11] Patent Number: 5,137,445
[45] Date of Patent: Aug. 11, 1992

[54] MULTIFUEL HEATER

[75] Inventor: William H. Chu, Lake Orion, Mich.

[73] Assignee: The United States of America as represented by the Secretary of the Army, Washington, D.C.

[21] Appl. No.: 774,948

[22] Filed: Oct. 11, 1991

[51] Int. Cl.⁵ .................................. F23D 3/40
[52] U.S. Cl. .................... 431/326; 431/263; 237/12.3 C; 126/110 B; 126/116 R
[58] Field of Search ........... 126/110 B, 110 R, 110 C, 126/116 R; 431/260-263, 326; 237/12.3 C

[56] References Cited

U.S. PATENT DOCUMENTS

| 2,492,756 | 12/1949 | McCollum | 431/263 |
| 3,086,579 | 4/1963 | Brown | 431/262 |
| 4,530,658 | 7/1985 | Panick | 237/12.3 C |
| 4,669,973 | 6/1987 | Langen et al. | 237/12.3 C |

Primary Examiner—James C. Yeung
Attorney, Agent, or Firm—Peter A. Taucher; Gail S. Soderling

[57] ABSTRACT

An improved multifuel heater having a means to provide a source of particulate free combustion air to a fuel ignition chamber.

2 Claims, 1 Drawing Sheet

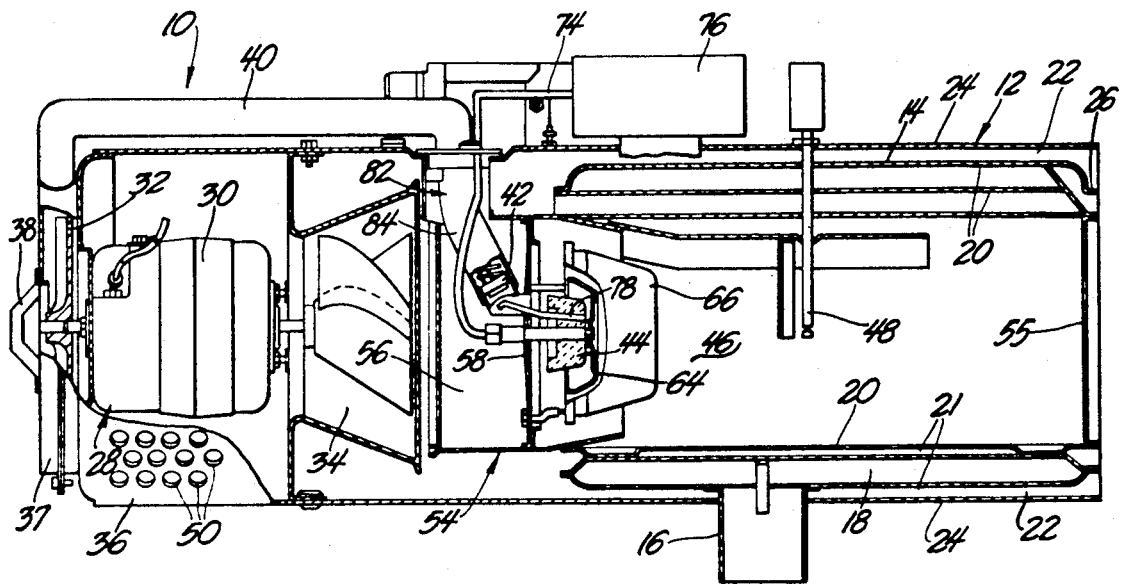
Fig. 1
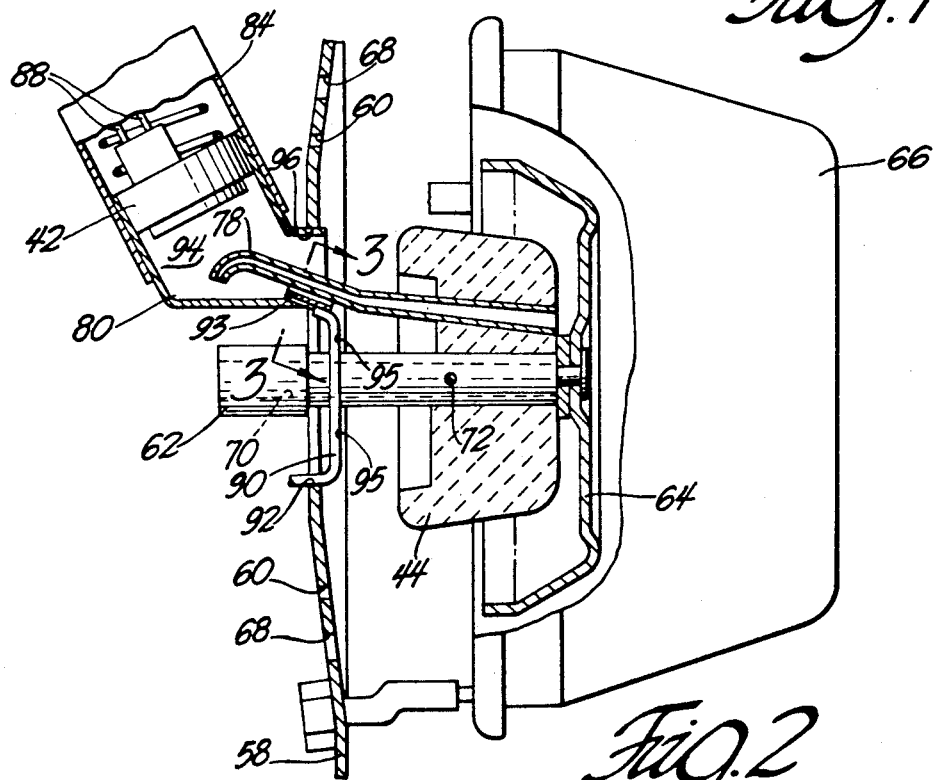
Fig. 2
Fig. 3

MULTIFUEL HEATER

GOVERNMENT INTEREST

The invention described herein may be manufactured, used, and licensed by or for the Government for governmental purposes without payment to me of any royalty thereon.

BACKGROUND OF THE INVENTION

1. Field of the Invention

In one aspect this invention relates to supplemental heaters for use in vehicles. In a further aspect, this invention relates to multifuel heaters using a external combustion air supply and external exhaust for use in vehicles.

2. Prior Art

The use of supplementary, forced air heaters in vehicles is well known. In military vehicles such heaters are subject to extreme environmental conditions of heat and dust not encountered by normal vehicles.

One example of a useful forced air heater is disclosed in U.S. Pat. No. 3,523,004. This patent discloses a heater configuration with a casing forming a combustion chamber and having an associated blower for forcing combustion air longitudinally through the combustion chamber. The burner has an apertured plate located transversely across the casing to direct the combustion air along predefined longitudinal paths. A cupped shaped member is positioned down stream from the plate with its open end directed toward the apertured plate to receive incoming combustion air. A ceramic wick is coaxially mounted in the combustion chamber inside the cup with a small space between the cup and the porous wick. The ceramic wick has a fuel source which feeds liquid fuel to the wick for vaporization and combustion.

Burners of this configuration have demonstrated good performance characteristics under various conditions; however, they can have problems with the dust and debris commonly found in battlefield environments, especially desert environments. This is particularly true since the combustion air supplied to the blower is drawn from the ambient atmosphere and is generally unfiltered. Filtration of the air to remove particulate material is normally not practicable as it would cause a large pressure drop in the air intake. The particles in the combustion air will clog the apertured plate and other air passages in the burner until the quantity of combustion air is reduced and the heater will be partially destroyed. The debris problem is particularly acute when the burner has an ignition wick which transports a quantity of fuel from the porous ceramic wick to an ignition cup. Because of the tolerances involved, the presence of dirt in combustion air furnished to the ignition cup can hamper heater start-up and continuing function.

SUMMARY OF THE INVENTION

The improved heater of this invention has a heater housing forming a combustion chamber with two associated blowers located at one end. The combustion blower forces combustion air longitudinally through the combustion chamber and the ventilation blower recirculates air to be heated through the heat exchanger. The burner has a plate with apertures serving to direct the combustion air along longitudinal paths. First and second cup shaped members are disposed to receive the air flow from the combustion air blower. A ceramic porous fuel vaporizer is positioned within the open end of the first cup shaped member and carried coaxially between the apertured plate and the first cup. A fuel supply means delivers fuel to the porous fuel vaporizer for evaporation into the combustion chamber and subsequent combustion. An igniter is positioned just above an igniter cup to initiate combustion of a quantity of fuel as it evaporates from a wich connected to the porous fuel vaporizer. An igniter air tube provides air into the igniter cup, the igniter air tube having a shield and air deflector associated therewith so that air which enters the igniter cup will follow a curved path thereby causing particles entrained in the combustion air to settle out. This provides clean air to the igniter cup.

DESCRIPTION OF THE DRAWING

FIG. 1 is is a side view of a heater according to this invention;

FIG. 2 is an enlarged sectional view of a portion of FIG. 1 detailing the burner assembly; and FIG. 3 is a view taken along the line 3—3 of FIG. 2.

DETAILED DESCRIPTION OF THE PREFERRED EMBODIMENTS

The multi fuel heater of the present invention has four basic assemblies: a heat exchanger housing; an air blower mounted on one end of the housing; a burner and ignition system; and a fuel control means.

Referring to the accompanying drawing where like numerals refer to like parts, FIG. 1 shows generally a heater 10 of this invention with a heat exchanger housing 12 which provides both the means for mounting the remaining components for cooperation and the means (not shown) to mount the assembled heater on a vehicle. Combustion of the desired fuel takes place within the heat exchanger housing 12 as will be described in greater detail below and the heated gases are driven through a heat exchanger 14 and out the exhaust outlet 16 on the surface of the housing. The exhaust is vented to the ambient surroundings. The hot combustion gases are driven through a plenum 18 defined by surfaces 20, 21 and heat the surfaces which in turn heat the ventilating air as it is forced through a heat exchanger plenum 22 defined by the outer surface 21 of the heat exchanger and the outer casing of the heat exchanger housing 12. The heated air exits the heat exchanger plenum 22 at outlet 26 and enters the passenger compartment of the vehicle, not shown. In military vehicles the ventilating air is generally drawn from the passenger compartment is a recycle mode and not from the outside atmosphere in order to prevent the incursion of contaminated air from the battle field. This is necessary to make the vehicle interior safe from nuclear, biological and chemical attack.

The heat exchanger housing 12 has an air blower assembly 28 mounted on one end of the heat exchanger housing. The air blower assembly 28 has a motor 30 which drives a combustion air impeller 32 and a ventilation air impeller 34. A shroud 36 surrounds the motor 30 and the impeller 34.

The combustion air impeller 32 is enclosed in housing 37 attached to one end of the shroud 36 and provides the air necessary to support fuel combustion within the combustion chamber 46. The combustion air impeller 32 shown is of the radial flow turbine type and will provide sufficient air to the combustion chamber at a positive pressure to support the heaters requirements.

The amount of air will depend on the amount of fuel necessary to achieve the desired BTU rating. The combustion air impeller will provide sufficient air to promote complete combustion. The combustion air is drawn from the ambient atmosphere by means of duct work (not shown) and will enter the housing 37 at an inlet 38 located on the end of the motor shroud and the combustion air impeller will force the combustion air into a combustion air tube 40 and then to a chamber 56 for direction into the burner assembly. The combustion air impeller 32 will generally be controlled so it runs at a reduced rate during the initial starting cycle to provide a rich fuel/air mixture to initiate fuel burning. When a flame detector switch 48 senses that ignition has taken place and burning has commenced, the combustion air impeller is accelerated until both the impellers 32, 34 will run at operating speed. A fuller description of the combustion process is contained in the burner assembly description.

Ventilation air is drawn into the motor shroud 36 through a plurality of apertures 50 in the shroud and moved by ventilation air impeller 34 onto a wall 54 and into the second plenum 22 where the ventilation air will be heated to the desired temperature as it passes over the heated outer surfaces 20, 21 of the heat exchanger and is discharged back into the passenger compartment (not shown). The ventilation air temperature from surface 21 is normally lower than the air outlet temperature from surface 20 so the extension housing 12 is being air cooled by this portion of the ventilation air.

As shown in greater detail in FIG. 2, the burner assembly has an igniter 42 to initiate burning, a wick 78, a fuel vaporizer 44, nested concentric cups 64, 66 and a combustion air tube 90 to promote maximum combustion. The burner assembly of this invention has a combustion air tube 90 to protect the wick 78 from particulate matter carried by the incoming combustion air.

The entry end of the combustion chamber is defined by the wall 54 located on one end of the cylindrical surfaces 20 of the heat exchanger so as to seal one end of the combustion chamber the other end being sealed by a wall 55. The combustion air tube 40 directs air from the combustion air impeller 32 into a chamber 56 defined by the wall 54, a portion of the cylindrical walls 20 and an apertured plate 58. The combustion air tube 40 is connected so as to discharge air into chamber 56 at a point offset from the igniter housing 82 so a very small portion of clean incoming combustion air would be directed at the igniter through the tube 90 rather than through the igniter tube 84. The apertured support plate functions to support the ceramic porous fuel vaporizer 44 and the first and second coaxially mounted cup members 64, 66 respectively. The apertured plate is formed with two concentrically formed rings of apertures 60, 68 each of the rings having apertures of a different form but each ring being formed with apertures of the same size and configuration. The apertures 60, 68 will cause the majority of combustion air to flow along spaced well defined paths parallel to the longitudinal axis of the combustion chamber 46 as the combustion air exits the chamber 56 through the apertured support plate and enters the combustion chamber 46. In general it is desirable to have the apertures formed as two distinct rings to direct the combustion air into the combustion chamber 46 as secondary and primary air flow paths. This will facilitate vaporization of the fuel, support complete combustion, and increase flame path length within the minimum space allowed in a very tight military vehicle environment by the two cup members 64, 66.

In greater detail, the primary combustion air under pressure from the chamber 56 will pass through the holes 60 circumferentially arranged about the support stud 62 which holds the primary elements of the burner assembly together. The primary combustion air will move along a member of paths, one path per hole the path being parallel to and coaxial with the stud 62 the air passing over the porous fuel vaporizer 4. As the air passes over the fuel vaporizer fuel will evaporate and carried towards the combustion chamber 46. The primary combustion air and fuel mixture will hit the interior wall of the first smaller cup member 64. As the primary combustion air fuel mixture hits the cup 64 it will reverse and flow back towards the apertured plate 58 creating a ring of highly pressurized half-burned air fuel mixture. This mixture is then mixed with the air from the holes 60 and hits the interior wall of cup 66. The approximately three-fourths burned air fuel mixture then reverses and mixes with the remaining air from apertures 60 flowing into the less pressurized combustion chamber 46. The fully combusted air and fuel mixture exits into the even lower pressure plenum 18 and finally exists at the exhaust 16.

The porous fuel vaporizer 44 can be formed of any porous material which is inert to the fuels used and can also withstand the heat generated by combustion. The porous fuel vaporizer 44 is mounted on the stud 62, the stud 62 being connected to a fuel line 74 (FIG. 1) which in turn is connected to a fuel pump control valve assemlby 76. Fuel from the fuel pump is delivered to a bore 70 running longitudinally through the stud 62 the bore having a plurality of apertures 72 radially formed therein the apertures being disposed to deliver fuel to the interior of the porous fuel vaporizer 44. The fuel control technology is within the skill of the art and full details are omitted in the interest of brevity.

The porous fuel vaporizer 44 has a wick 78 with one end in the porous fuel vaporizer 44 the wick extending back through the apertured plate 58 to an igniter pocket 80. The wick 78 will provide a small amount of very rich fuel air mixture to the space 94 located in the lower portion of the igniter pocket below the wick as shown to initiate ignition of the fuel. The ignited flame will pass around the end of the wick through an opening 96 to further ignite the larger quantity of air fuel mixture surrounding the vaporizer 44. The igniter pocket 80 is in close proximity to the igniter assembly 82 which has an igniter tube 84 carrying the igniter 42. The igniter 42 can be of the wound resistance element type similar to a cigar lighter generally available in automobiles. The igniter 42 is attached to a source of electrical power by lines 88 which will cause the igniter to glow during start up of the heater and ignite the rich fuel-air mixture in the ignition pocket 80.

The presence of particulate matter in the combustion air normally supplied to the igniter 42 can create problems with ignition and continued operation of the heater. To alleviate this problem the heater of the present invention has a tube 90 with one end affixed to an opening 92 in the apertured plate 58 and the other end being located in the ignition pocket. The tube is shaped so that it makes a substantially right angle turn as it enters the ignition pocket and has an extension 93 shaped as a shallow W about the wick 78 to protect the wick and prevent air entering the igniter pocket from impinging directly on to the wick. This ensures that particulate matter entering the ignition pocket will settle out of the air stream towards the bottom of the igniter pocket and not foul the wick.

The tube 90 extends outward from plate 58 and has a larger opening than that need to provide minimum air flow to the ignition pocket to reduce the possibility that dirt will occlude the opening during operation. A portion of the additional air can be discharged from openings 95 to discharge particulate matter in the tube and provide a pressurized air space behind the vaporizer 44 and plate 58. This pressurized air space will encourage the proper flow of fuel air from the igniter to the combustion area of the heater.

Various modifications and alterations will become apparent to those skilled in the art without departing from the scope and spirit of this invention and it is understood this invention is not limited to the illustrative embodiment set forth above.

What is claimed is:

1. In a fuel burner connected to a source of fuel for use as a heater including a heat exchanger housing with a blower assembly mounted on one end of the heat exchanger housing the blower assembly being positioned to force pressurized combustion air and air to be heated through the heat exchanger housing; a burner assembly mounted within the heat exchanger housing the burner assembly having an apertured plate mounted in the path of the combustion air, a combustion cup located on the side of the apertured plate opposite the blower assembly to intercept combustion air after it passes through the apertured plate, a porous fuel vaporizer mounted on the apertured plate between the apertured plate and the combustion cup, an ignition cup mounted coaxially with the fuel vaporizer between the fuel vaporizer and the combustion cup, and a wick, the wick having one end in contact with the fuel vaporizer so as to receive fuel from the vaporizer, the other end of the wick being located in an igniter pocket near an igniter, the improvement comprising: a combustion air tube having a first end affixed to an opening in the apertured plate so as to receive a quantity of the pressurized combustion air from a chamber on the side of the apertured plate opposite the burner assembly maintained at an elevated pressure by the blower assembly, the combustion air tube being sized to provide a calibrated amount of clean air to the igniter pocket for ignition enhancement, the combustion air tube having a shallow W-shaped shield at its end near the wick to prevent direct impingement of combustion air onto the wick and the combustion air tube being formed with a right angle bend near the W-shaped shield.

2. The heater assembly of claim 1 wherein the improvement further comprises: one or more apertures formed in the combustion air tube along its length so that a portion of the air will exit from the air tube to remove particulate material from the air tube and further the air from said apertures will provide a source of pressurized air to the porous wick.

* * * * *